United States Patent Office 3,401,149
Patented Sept. 10, 1968

3,401,149
PROCESS FOR THE PREPARATION OF
ACROLEIN COPOLYMERS
Robert Buning, Oberlar, and Gerhard Bier, Troisdorf,
Germany, assignors to Dynamit Nobel A.G., Troisdorf,
Germany, a corporation of Germany
No Drawing. Continuation-in-part of application Ser. No.
424,138, Jan. 7, 1965. This application July 3, 1967,
Ser. No. 650,623
Claims priority, application Germany, Jan. 11, 1964,
D 43,330
3 Claims. (Cl. 260—73)

ABSTRACT OF THE DISCLOSURE

This specification describes a novel process for producing polymers of acrolein and a vinyl alkyl ether which may have one or more additional comonomers. The polymerization is carried out in the presence of cyclohexane sulfonyl acetyl peroxide catalyst.

This application is a continuation-in-part of application Ser. No. 424,138, filed Jan. 7, 1965, now abandoned.

It is known in the prior art that acrolein may be polymerized with peroxides to form high molecular weight polymers. Benzoyl peroxide and butylhydroperoxide have been effectively employed as catalysts for this end; however, dibutyl peroxide is practically ineffective. Therefore, although organic peroxides are generally suitable, not all compounds can be used.

The prior art peroxide catalysts, however, have additional drawbacks in that they are not very effective for the polymerization of acrolein at room temperature or lower.

Azo compounds, such as azoisobutyric acid nitrile, are also known polymerization catalysts for acrolein, but they, like organic peroxides, are not very effective at low temperatures. For example, acrolein is polymerized only to the extent of 65% with azoisobutyric acid nitrile after six days at 20° C.

Redox systems, however, are effective catalysts for the polymerization of acrolein at lower temperatures and generally effect higher yields of polymer. For example, a catalyst comprising potassium persulfate-silver nitrate mixtures will promote 100% polymerization of acrolein in 30 minutes at 20° C. The prior art redox catalyst always contain a certain proportion of heavy metal salts which remain in the polymer as residues and have to be removed, usually at great expense. When using these catalysts for the commercial production of polyacrolein and its copolymers, additional expense is also incurred in removing the rapidly evolved heat of polymerization from the reaction mass due to high polymerization rates.

It is known in the art that the difficulties experienced in the production of acrolein polymerizates having properties whereby they retain their shape in heat lie in their poor deformability such as, for example, pressing or extruding.

It is therefore an object of this invention to provide a catalyst for the copolymerization of acrolein which will be effective at ambient temperatures or lower. It is another object of this invention to provide a method and catalyst for the copolymerization of acrolein at relatively high conversions and short periods of time. Another object of this invention is to provide a catalyst that will not contaminate the acrolein polymerizate. Additionally, this invention has as one of its objects a novel method and catalyst for the polymerization of acrolein, whereby rapid evolution of heat is avoided. A further object of this invention is to provide an acrolein polymerizate that may be readily molded by heat and pressure and also has good heat-resistant properties.

These and other objects of the invention have been achieved by the copolymerization of acrolein with a vinyl alkyl ether in the presence of a catalyst comprising cyclohexane sulfonyl acetyl peroxide. It is particularly advantageous to conduct the polymerization in an aqueous medium in which the monomers are emulsified and suspended in water with the aid of emulsifying and suspending agents well known in the art. The polymerization is conducted at temperatures not substantially higher than approximately 35° C., and preferably between 15° and 30° C., although it is possible to use temperatures as low as +5° C. Since the sulfonyl acetyl peroxide catalyst of this invention is free from heavy metals, no difficulty or expense is encountered in removing catalytic metal residues from the finished polymer as is experienced with some prior art redox catalysts.

It has been unexpectedly found that the rate of polymerization is greatly accelerated by copolymerizing acrolein with vinyl ethers, such as vinyl alkylethers, in the presence of cyclohexane sulfonyl acetyl peroxide. This result is unexpected, since vinyl ethers generally retard the polymerization of other monomers. Polymerizations of acrolein with benzoyl acetyl peroxide and t-butyl perpivalate, however, are not accelerated by vinyl ether. The polymerization is stopped by addition of water and simultaneous separation of the polymer. Suitable vinyl alkyl ethers for copolymerization with acrolein, according to this invention, include vinyl methyl ether, vinyl ethyl ether, vinyl propyl ether, vinyl isobutyl ether, vinyl iso-octyl ether and the like and various mixture thereof.

Acrolein can also be copolymerized by the catalyst of this invention with other vinyl monomers in addition to vinyl ethyl ether, such as N-vinylpyrrolidone, vinylcarbazole, vinylchloride, vinylidene chloride, acrylic acid, methacrylic acid, ethylene, or the like, and various mixtures thereof. The polymers, including polyacrolein per se, obtained by the method of this invention may be shaped under conditions of heat and pressure. This is particularly significant, since pure polyacrolein does not ordinarily lend itself to shaping techniques commonly employed with thermoplastic materials. The shaped articles also exhibit high temperature resistance, usually in the order in excess of 130° C., as measured by the Vicat method, described by H. Houwink, Chenie und Technologie der Kunststoffe, volume I, 3rd edition (1954), page 652.

The following nonlimiting examples are given as certain preferred embodiments and illustrations of the invention and are not to be construed as narrowing the novel and inventive catalyst and method of polymerization of the applicant.

EXAMPLES I–IV

Fifty grams of acrolein in 60 cubic centimeters of oxygen-free water are stirred under highly purified nitrogen, after which one gram of cyclohexane sulfonyl acetyl peroxide is added. The mixture is polymerized at a temperature of 20° C. and holted after five hours. The polymer is removed from the polymerization vessel by means of a suction filter. This process is repeated, however, with the addition of varying amounts of vinyl ethyl ether; the results are given in Table I.

TABLE I

| Example | Vinyl ethyl ether (grams) | Yield (grams) | Relative viscosity |
|---|---|---|---|
| I | 0 | 8 | 2.4 |
| II | 1 | 12 | 2.1 |
| III | 5 | 18 | 1.9 |
| IV | 10 | 30 | 2.2 |

Examples I through IV inclusive demonstrate the effectiveness of vinyl ether in improving the yield of copolymers per se, or when compared to polyacrolein production alone. Example II demonstrates that a small proportion of vinyl ether added to the acrolein polymerization action will increase the yield by 50 percent.

Results analogous to those in Table I are obtained with other vinyl ethers and vinyl compounds.

EXAMPLE V

The polymers of Examples II, III and IV are compressed into plates by the application of pressure at 190° C. The heat resistance of all these copolymers is higher than 130° C., as measured by the Vicat method employing a 5-kg. load.

EXAMPLE VI

The method of Example III is repeated with the addition of 10 grams N-vinylpyrrolidone, and a mixed polymerizate of acrolein vinyl ethyl ether and N-vinylpyrrolidone having a relative viscosity of 2.3 is obtained which is compressed into transparent sheets. The yields obtained are substantially higher than those where polyacrolein per se is polymerized. The heat resistance of the sheets thus obtained is higher than 130° C. when measured according to the Vicat method.

EXAMPLE VII

Eight hundred grams acrolein and 80 g. vinyl ethyl ether are copolymerized in a glass vessel with 8 g. cyclohexane sulfonyl acetyl peroxide at 25° C. After 50 hours, a 95% yield of a mixed polymerizate is obtained.

EXAMPLE VIII

The polymerization of Example VII is carried out with vinyl ethyl ether, and the polymerization rate is observed to be delayed by about 40%.

EXAMPLE IX

The polymerization of Example VII is repeated, except the vinyl ethyl ether constituent is increased by 10%. The polymerization rate is observed to increase by about 40%.

The copolymerization of the acrolein with vinyl ethers in substance thus proceeds more rapidly than the homopolymerization. This applies only in the use of cyclohexane sulfonyl acetyl peroxide as catalyst. Other peroxides, such as benzoyl acetyl peroxide, t-butyl perpivalate or the like, show lower yields.

Thus, there has been disclosed and described a method for manufacturing copolymers of acrolein by means of a novel catalyst comprising cyclohexane sulfonyl acetyl peroxide.

Although the invention has been described with reference to certain preferred embodiments, it is not the applicant's intention to be limited thereby, and certain obvious modifications of the novel process and catalyst are intended to be included within the broad scope of the invention, as embodied in the following claims.

As will be seen, the vinyl alkyl ether useful as a comonomer is preferably one containing up to about 8 carbon atoms in the alkyl group. As can be seen from the examples, about 2 to 20 weight percent of the monomer used is vinyl alkyl ether and, in the case of ter or higher polymers, up to about 20 weight percent of the monomer mixture may be monomers other than acrolein or vinyl alkyl ether.

What is claimed is:

1. Process for the copolymerization of a monomer mixture consisting of acrolein and about 2 to 20 weight percent based upon total monomer, of a vinyl, alkyl ether containing up to about 8 carbon atoms in the alkyl group, which process comprises contacting said monomers in an aqueous medium at about 5 to 35° C. with cyclohexane sulfonyl acetyl peroxide catalyst.

2. A process for interpolymerizing a monomer mixture consisting of acrolein, about 2 to 20 weight percent, based upon total monomer, of a vinyl alkyl ether containing up to about 8 carbon atoms in the alkyl group and up to about 20 weight percent of total monomer of a monomer selected from the group consisting of N-vinyl pyrrolidone, vinyl carbazole, vinyl chloride, vinylidene chloride, acrylic acid, methacrylic acid and ethylene which process comprises contacting said monomers in an aqueous medium at about 5 to 35° C. with cyclohexane sulfonyl acetyl peroxide catalyst.

3. Process as claimed in claim 1 wherein said ether is vinyl ethyl ether.

References Cited

UNITED STATES PATENTS

| | | | |
|---|---|---|---|
| 2,144,067 | 1/1939 | Kranzlein | 260—73 |
| 2,467,430 | 4/1949 | Izard | 260—73 |
| 2,975,162 | 3/1961 | Iloff | 260—85.7 |

JAMES A. SEIDLECK, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,149            September 10, 1968

Robert Buning et al.

It is certified that error appears in the above identified patent and that said Letters Patent are hereby corrected as shown below:

Column 2, line 30, "mixture" should read -- mixtures --; line 58, "holted" should read -- halted --. Column 3, line 31, "with" should read -- without --.

Signed and sealed this 17th day of February 1970.

(SEAL)
Attest:

Edward M. Fletcher, Jr.            WILLIAM E. SCHUYLER, JR.
Attesting Officer            Commissioner of Patents